(12) United States Patent
Wagoner et al.

(10) Patent No.: US 9,281,761 B2
(45) Date of Patent: Mar. 8, 2016

(54) CONTROL SCHEME FOR CURRENT BALANCING BETWEEN PARALLEL BRIDGE CIRCUITS

(71) Applicant: General Electric Company, Schenectady, NY (US)

(72) Inventors: Robert Gregory Wagoner, Roanoke, VA (US); David Smith, Daleville, VA (US)

(73) Assignee: General Electric Company, Schenectady, NY (US)

( * ) Notice: Subject to any disclaimer, the term of this patent is extended or adjusted under 35 U.S.C. 154(b) by 414 days.

(21) Appl. No.: 13/744,948

(22) Filed: Jan. 18, 2013

(65) Prior Publication Data

US 2014/0204643 A1 Jul. 24, 2014

(51) Int. Cl.
*H02M 3/158* (2006.01)
*H02M 7/493* (2007.01)
*H02M 7/5387* (2007.01)
*H02M 7/48* (2007.01)

(52) U.S. Cl.
CPC .......... *H02M 7/5387* (2013.01); *H02M 3/1584* (2013.01); *H02M 7/493* (2013.01); *H02M 2003/1586* (2013.01); *H02M 2007/4822* (2013.01)

(58) Field of Classification Search
CPC ................ H02M 7/521; H02M 7/493; H02M 2007/4822; H02M 2003/1586; H02M 3/1584
USPC .......... 323/237, 272, 271; 363/32–37, 71, 65, 363/98, 132
See application file for complete search history.

(56) References Cited

U.S. PATENT DOCUMENTS

| | | | |
|---|---|---|---|
| 5,070,440 A * | 12/1991 | Walker | H02M 7/493 363/137 |
| 5,526,252 A * | 6/1996 | Erdman | 363/41 |
| 6,545,450 B1 | 4/2003 | Ledenev et al. | |
| 6,751,106 B2 | 6/2004 | Zhang et al. | |
| 7,446,435 B2 | 11/2008 | Zhang et al. | |
| 7,643,318 B2 | 1/2010 | Wagoner | |
| 7,876,191 B2 | 1/2011 | Chandrasekaran et al. | |
| 7,928,592 B2 * | 4/2011 | Wagoner et al. | 290/44 |
| 7,939,959 B2 | 5/2011 | Wagoner et al. | |
| 7,944,068 B2 | 5/2011 | Wagoner et al. | |
| 8,138,620 B2 | 3/2012 | Wagoner et al. | |
| 8,270,191 B2 | 9/2012 | Zhu et al. | |
| 8,310,074 B2 | 11/2012 | Larsen et al. | |
| 2004/0233690 A1 | 11/2004 | Ledenev et al. | |
| 2006/0119992 A1* | 6/2006 | Pearce | H02M 3/1584 361/18 |
| 2008/0054874 A1 | 3/2008 | Chandrasekaran et al. | |

(Continued)

*Primary Examiner* — Timothy J Dole
*Assistant Examiner* — Ishrat Jamali
(74) *Attorney, Agent, or Firm* — Dority & Manning, P.A.

(57) ABSTRACT

A control scheme for reducing current imbalance between parallel bridge circuits in a power converter system is provided. The power converter can include a plurality of bridge circuits coupled in parallel to increase the output power capability of the power system. The parallel bridge circuits can be controlled pursuant to a control scheme for reducing current imbalance between the parallel bridge circuits. In particular, a pulse test can be performed in which a pulse is applied to each of the plurality of bridge circuits. The switch timing of the switching elements responsive to the pulse can be measured and analyzed to determine a timing difference adjustment for one or more of the switching elements of the plurality of bridge circuits. The timing difference adjustment can be stored and used to adjust all subsequent switching events in the parallel bridge circuits.

15 Claims, 6 Drawing Sheets

(56) References Cited

U.S. PATENT DOCUMENTS

| | | | |
|---|---|---|---|
| 2010/0188135 A1* | 7/2010 | Keronen | H02M 7/493 327/482 |
| 2010/0254168 A1 | 10/2010 | Chandrasekaran | |
| 2011/0032738 A1* | 2/2011 | Skinner et al. | 363/126 |
| 2011/0299311 A1 | 12/2011 | Zhu et al. | |

* cited by examiner

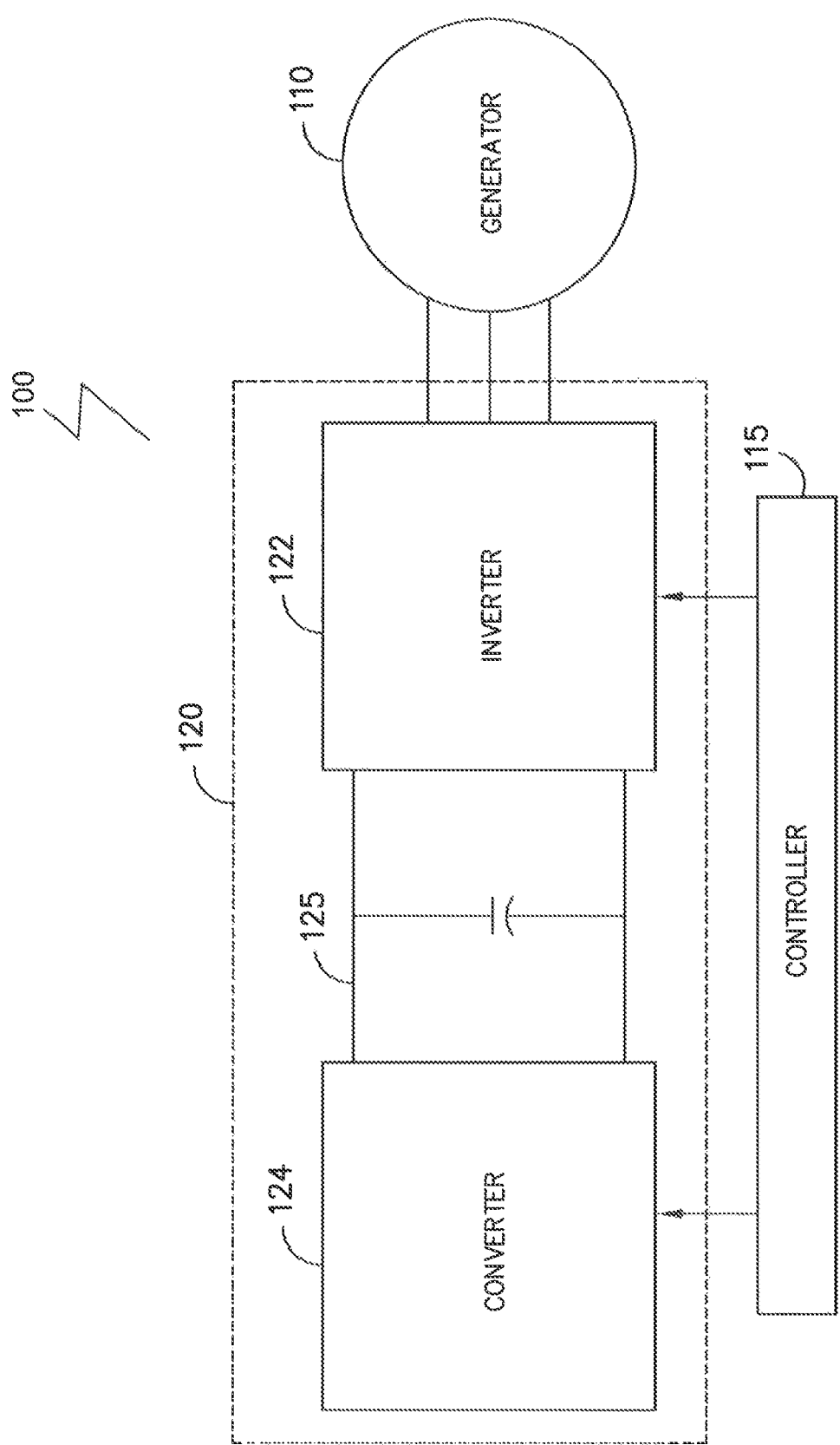
FIG. -1-

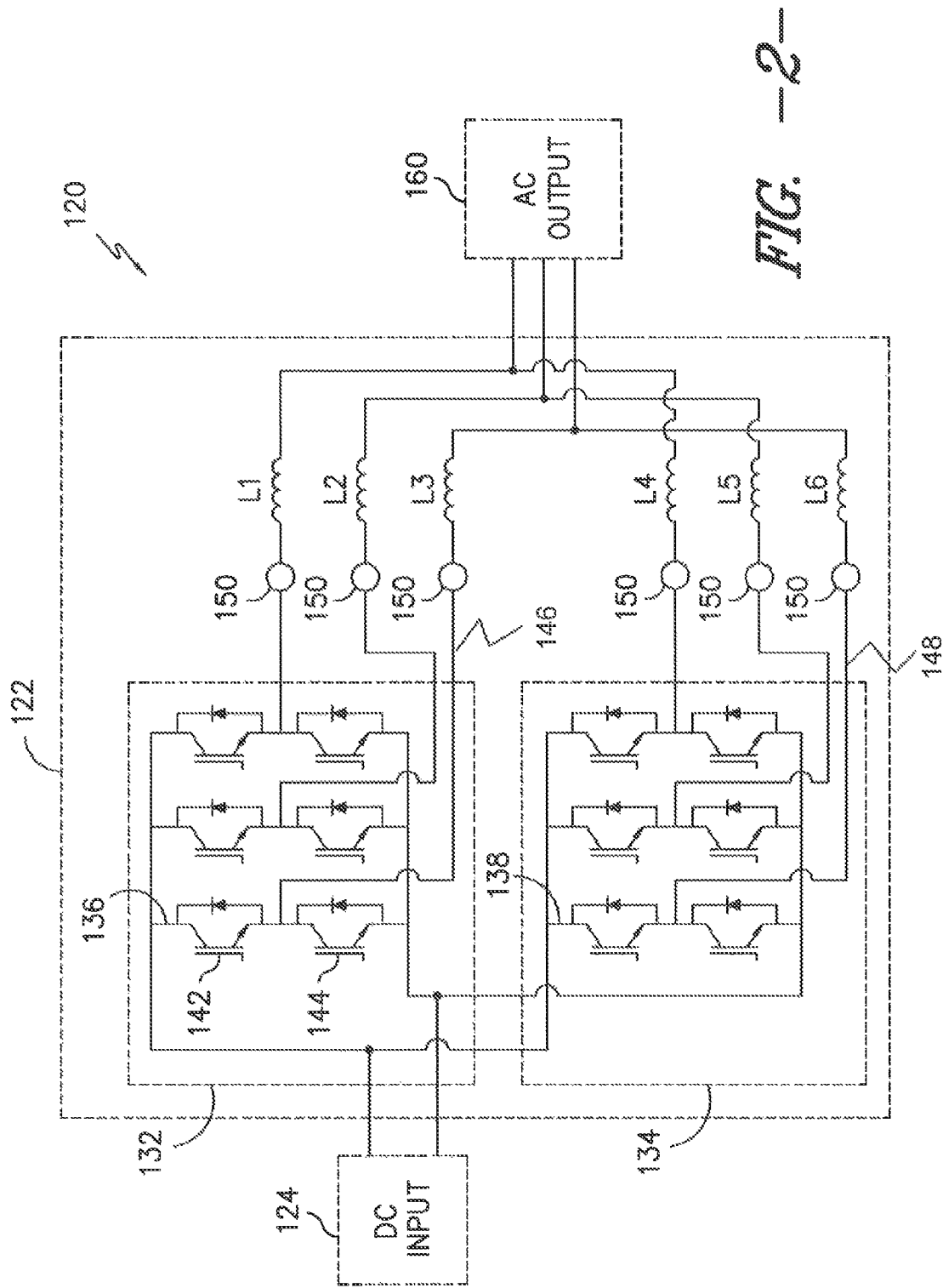
FIG. -2-

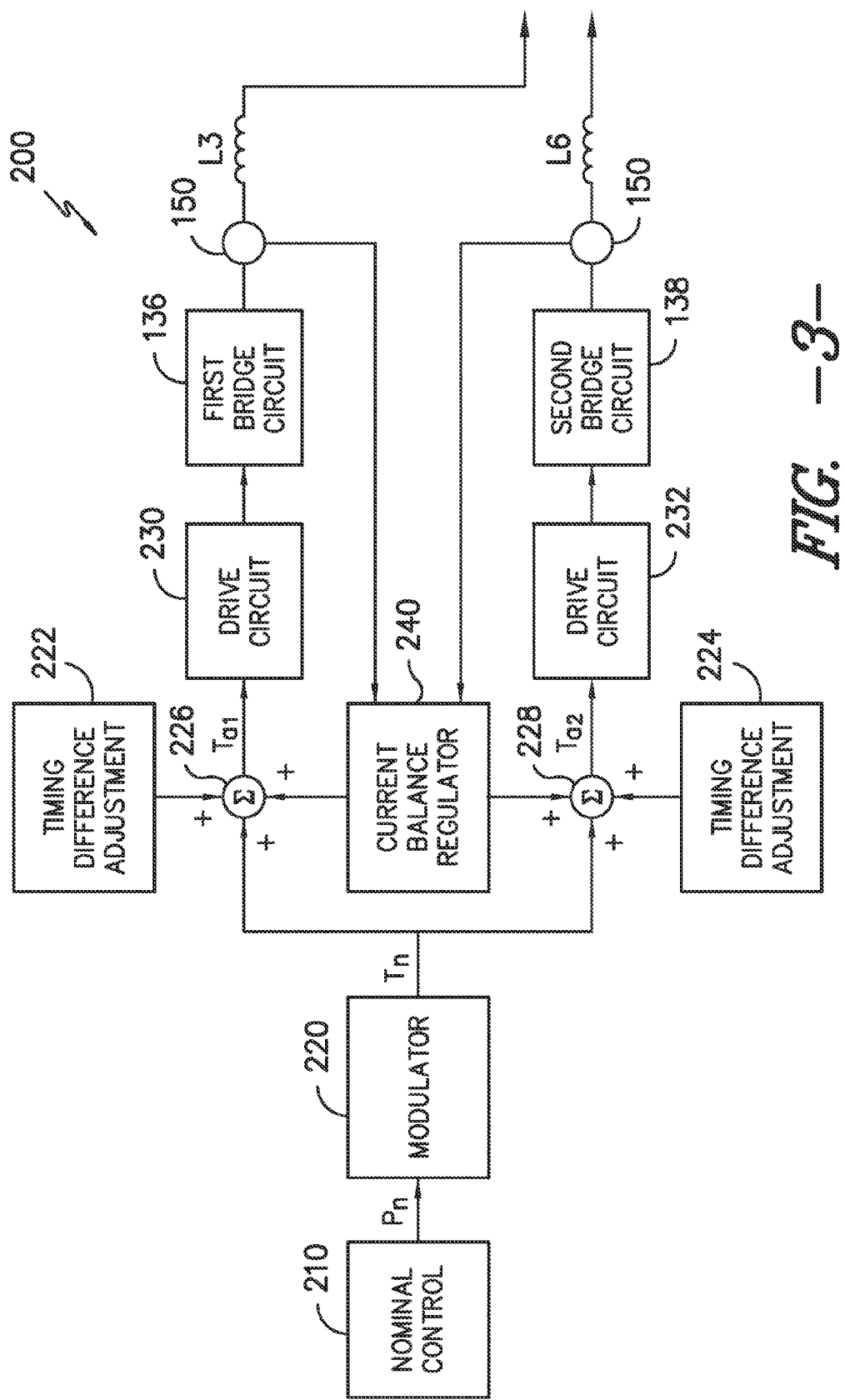
FIG. -3-

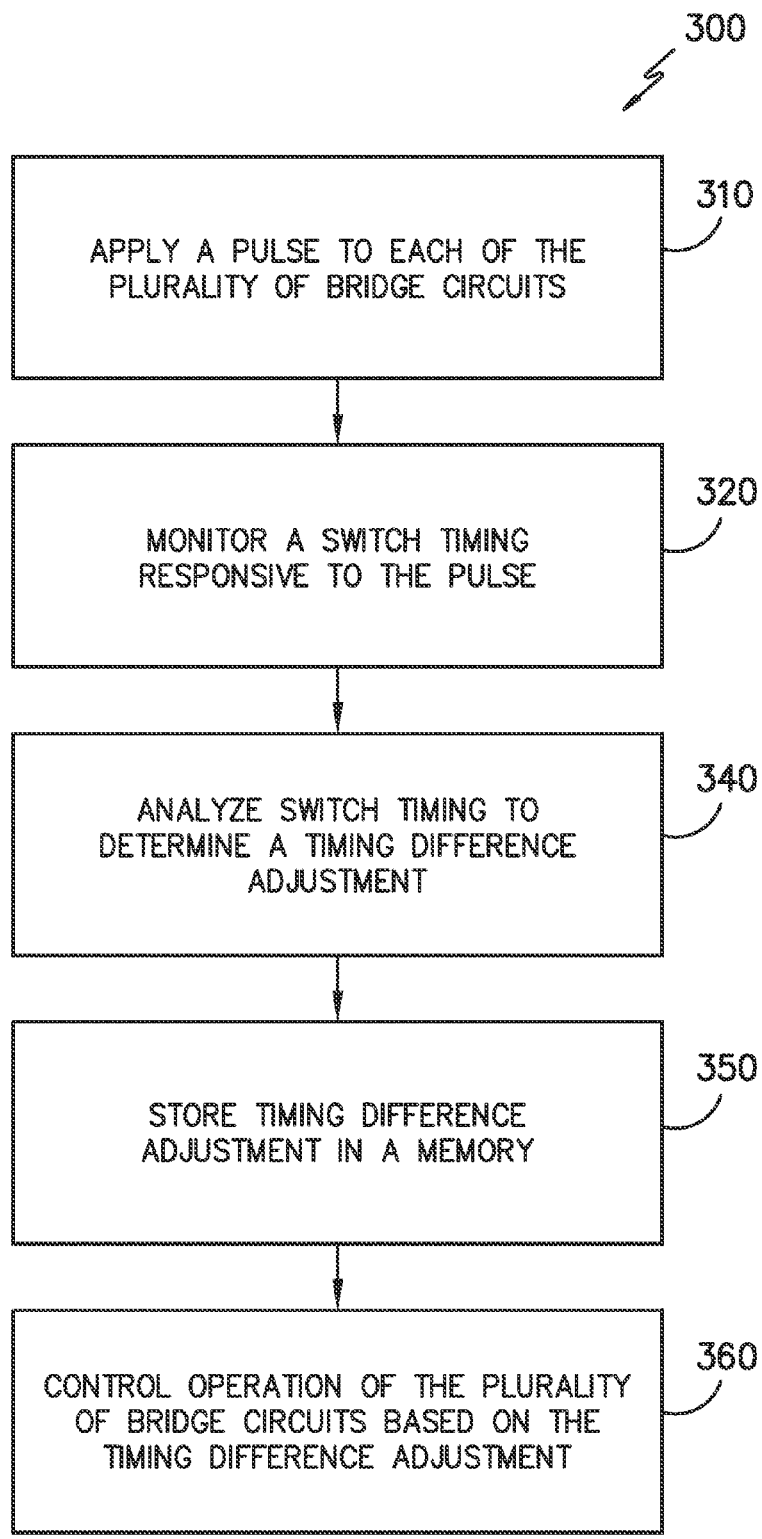
FIG. —4—

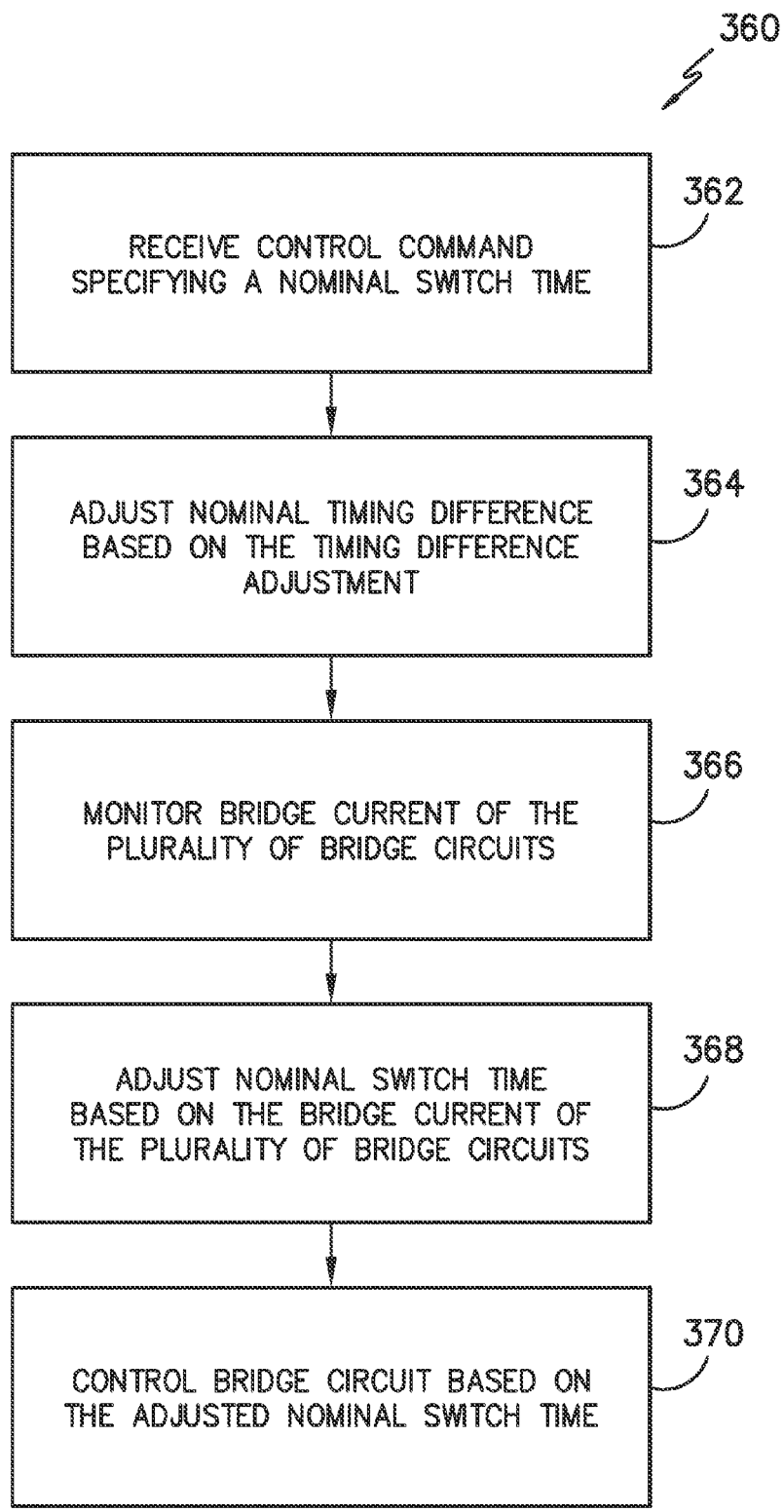
FIG. —5—

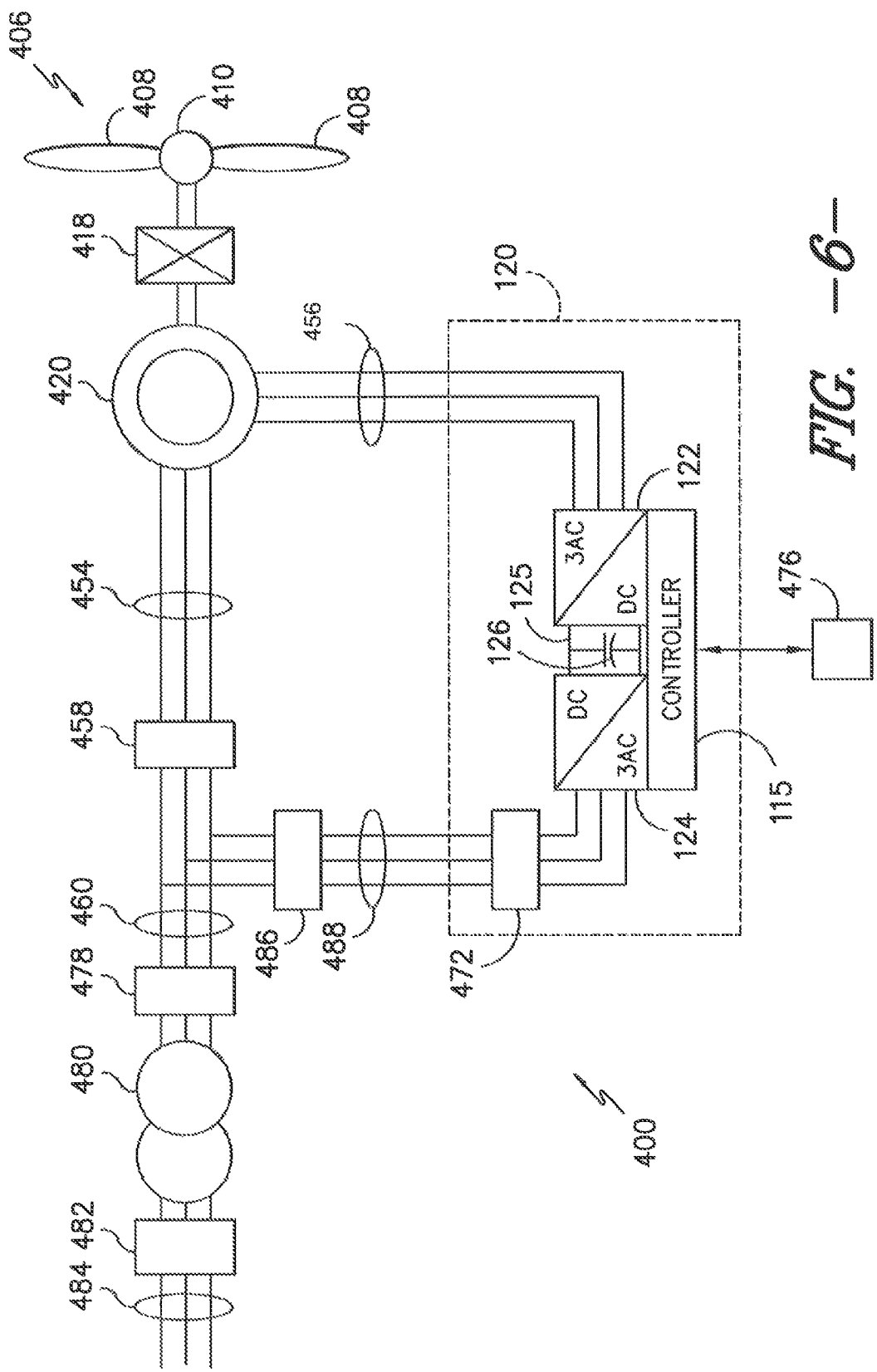
FIG. -6-

CONTROL SCHEME FOR CURRENT BALANCING BETWEEN PARALLEL BRIDGE CIRCUITS

FIELD OF THE INVENTION

The present disclosure relates generally to power converters, and more particularly to a control scheme to reduce current imbalance among parallel bridge circuits in a power converter.

BACKGROUND OF THE INVENTION

Power systems often include a power converter that is configured to convert direct current (DC) power into a suitable power for application to a load, such as a generator, motor, electrical grid, or other suitable load. For instance, a power generation system can include a power converter for producing alternating current (AC) power at a grid frequency (e.g. 60/50 Hz) suitable for application to an electrical grid. In solar or batter energy systems, the solar or battery source can provide direct current power to the power converter, which can then be converted to suitable AC output power for the electrical grid. In applications requiring AC to AC conversion, such as wind energy applications, the power converter can include a two stage power converter to provide AC to DC to AC conversion.

To provide increased output power capability, a power converter can include a plurality of bridge circuits coupled in parallel with one another. Each bridge circuit can include a plurality of switching elements (e.g. insulated gate bipolar transistors (IGBTs)). The pulse-width-modulation (PWM) of the switching elements can be controlled according to a desired switching pattern to provide a desired output of the power converter. The use of switching elements, such as IGBTs, in a power converter can produce undesirable high frequency components in the output power provided by the power converter. To reduce these undesirable high frequency components, one or more inductive elements can be used in conjunction with the bridge circuits to filter the high frequency components.

Timing differences can exist between the switching of the switching elements in the parallel bridge circuits. These timing differences can result from, for instance, different delay times provided by optoisolators and other components of driver circuits used to drive the switching elements. In addition, timing differences can result from controlling the parallel bridge circuit according to a switching pattern that provides for switching of the switching elements in a manner out of phase with one another, such as according to an interleaved switching pattern. The timing differences can induce a voltage across an inductive element effectively coupled between the plurality of parallel bridge circuits, resulting in a circulating current between the parallel bridge circuits.

The circulating current between parallel bridge circuits can cause a current imbalance between the parallel bridge circuits. The imbalance in current can result in a difference of temperatures in the switching elements used in the parallel bridge circuits, such as a difference in junction temperature of IGBTs used in the switching elements. This reduces the overall output power capability of the power converter as the total output current capability is limited by the switching element with the highest temperature.

Thus, a need exists for a control scheme for reducing current imbalance among parallel bridge circuits in a power converter used in power systems.

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to a control method for reducing current imbalance between a plurality of bridge circuits in a power converter. The plurality of bridge circuits are coupled in parallel. The method includes applying a pulse to each of the plurality of bridge circuits coupled in parallel. Each of the plurality of bridge circuits includes at least one switching element. The method includes monitoring a switch timing responsive to the pulse of each switching element of the plurality of bridge circuits and analyzing the switch timing of each switching element to determine a timing difference adjustment for one or more of the switching elements of the plurality of bridge circuits. The method further includes controlling operation of the plurality of bridge circuits based at least in part on the timing difference adjustment.

Another exemplary aspect of the present disclosure is directed to a control system for reducing current imbalance in a power converter. The control system includes a plurality of bridge circuits coupled in parallel. Each of the plurality of bridge circuits includes at least one switching element. The control system includes a modulator configured to provide one or more control commands to the plurality of bridge circuits coupled in parallel. Each of the one or more control commands controls a nominal switch time for one of the switching elements of the plurality of bridge circuits coupled in parallel. The control system further includes a control circuit configured to adjust the nominal switch time for the one or more control commands based at least in part on a timing difference adjustment determined for at least one of the switching elements of the plurality of bridge circuits. The timing difference adjustment is determined based on a switch timing measured responsive to a pulse applied to the plurality of bridge circuits.

Yet another exemplary aspect of the present disclosure is directed to a power converter system. The system includes a plurality of bridge circuits coupled in parallel. Each of the plurality of bridge circuits includes a pair of switching elements coupled in series with one another. The system further includes a control system configured to reduce current imbalance between the plurality of bridge circuits coupled in parallel. The control system includes a modulator configured to provide one or more control commands to the plurality of bridge circuits coupled in parallel. Each of the one or more control commands specifies a nominal switch time for one of the switching elements of the plurality of bridge circuits coupled in parallel. The control system further includes a control circuit configured to adjust the nominal switch time of the one or more control commands based at least in part on a timing difference adjustment determined for at least one of the switching elements of the plurality of bridge circuits. The timing difference adjustment is determined based on a switch timing measured responsive to a pulse applied to the plurality of bridge circuits.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 depicts a block diagram of an exemplary power converter system according to an exemplary embodiment of the present disclosure FIG. 2 depicts a circuit diagram of an exemplary power converter system according to an exemplary embodiment of the present disclosure;

FIG. 3 depicts a control system according to an exemplary embodiment of the present disclosure;

FIG. 4 depicts a flow diagram of an exemplary method according to an exemplary embodiment of the present disclosure;

FIG. 5 depicts a flow diagram of an exemplary method of controlling operation of a plurality of bridge circuits coupled in parallel based at least in part on a timing difference adjustment according to an exemplary embodiment of the present disclosure; and FIG. 6 depicts an exemplary DFIG system according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a control scheme for reducing current imbalance between parallel bridge circuits in a power converter system. In particular, a power converter can be used to provide a desired power to a load, such as a generator, motor, electrical grid, or other suitable load. The power converter can include a plurality of bridge circuits coupled in parallel to increase the output power capability of the power system. Each of the bridge circuits can include a pair of switching elements, such as insulated gate bipolar transistors (IGBTs), coupled in series with one another. The parallel bridge circuits can be controlled, for instance, using control commands (e.g. pulse width modulation commands) provided to the switching elements, to provide a desired output of the power converter. Current imbalance can exist between the parallel bridge circuits as a result of timing differences between the switching elements of the parallel bridge circuits.

According to aspects of the present disclosure, the parallel bridge circuits can be controlled pursuant to a control scheme for reducing current imbalance between the parallel bridge circuits. In particular, a pulse test can be performed in which a pulse is applied to each of the plurality of bridge circuits. The switch timing of the switching elements responsive to the pulse can be measured to identify any timing differences between the switching of the switching elements. For example, a controller can automatically perform the pulse test and measure the timing difference using voltage feedback circuits/sensor that instrument the bridge output voltage of the bridge circuits.

The timing differences can be analyzed, for instance by a controller, to determine a timing difference adjustment for one or more of the switching elements of the plurality of bridge circuits. The timing difference adjustment can be stored and used to adjust all subsequent switching events in the parallel bridge circuits. For instance, nominal switch times specified by control commands for the bridge circuits can be adjusted based on the timing difference adjustment to reduce or null out any timing differences in the operation of the switching elements. In this manner, current imbalance between the parallel bridge circuits can be addressed before the current imbalance occurs.

The control scheme can be used in conjunction with a closed loop control scheme to further reduce current imbalance between the parallel bridge circuits and to compensate for any changes in switch timing resulting from, for instance, temperature or other operating conditions. In one particular implementation, the bridge current of the parallel bridge circuits can be monitored using current sensors. The nominal switch times specified by control commands can be further adjusted based on the monitored bridge currents, for instance, to reduce or minimize the difference between the monitored bridge currents.

Reducing current imbalance among the parallel bridge circuits according to aspects of the present disclosure can provide increased output power capability of the power converter. For instance, the parallel bridge circuits can be controlled to have balanced currents such that reduced power is dissipated as current circulating between parallel bridge circuits. In addition, differences in temperature of the switching elements, such as junction temperature of IGBTs, may no longer limit output power capability for the power converter.

With reference now to the FIGS., exemplary embodiments of the present disclosure will now be discussed in detail. FIG. 1 depicts a block diagram of an exemplary power system 100 according to an exemplary embodiment of the present disclosure. The power system includes a generator 110 configured to generate AC power and to provide the AC power to the power converter 120. The generator 110 can be a wind driven generator or other suitable generator. The present disclosure will be discussed with reference to a power generation system where a generator is a load of the power system 100. Those of ordinary skill in the art, using the disclosures provided herein, will understand that the power system 100 can be used with any type of load, such as a motor, generator, electrical grid, or other suitable load. In addition, while a generator is traditionally a supplier of electrical power, a generator can act as a load for purposes of the present disclosure.

The power converter 120 can be a two stage power converter and can include an inverter 122 (i.e. DC to AC conversion stage), a converter 124, and a controller 115. The inverter 122 and the converter 124 can be coupled together by a DC link 125. The present disclosure will be discussed with reference to a two-stage power converter system 100 for purposes of illustration and discussion. Those of ordinary skill in the art, using the disclosures provided herein, will understand that the control scheme according to aspects of the present disclosure is applicable to any suitable power converter system.

The inverter 122 can receive multiphase (e.g. 3-phase) AC power from the generator 110 and can convert the AC power to DC power for application to the DC link 125. The converter 124 can be a DC to AC converter and can convert the DC power on the DC link 225 to a suitable output power for application to an electrical grid. For instance, the converter 124 can convert the DC power to multiphase (e.g. 3-phase) AC power at a grid frequency (e.g. 50/60 Hz) for application to an electrical grid.

The power converter 120 of FIG. 1 can be used in other power systems without deviating from the scope of the present disclosure. For instance, the power converter 120 can be used to convert DC power generated from a solar or battery storage system to suitable AC power for application to an electrical grid. In particular, the DC source (e.g. a photovoltaic array) can provide DC power to the converter 124. In this exemplary implementation, the converter 124 can be a boost converter, a buck converter, or a buck/boost converter used to provide DC power to the DC link 125. The inverter 122 can convert the DC power on the DC link 125 to a suitable output power for application to an electric grid, such as a multiphase (e.g. 3-phase) AC power having a grid frequency (e.g. 50/60 Hz).

As will be discussed in more detail below, one or more of the inverter 122 and the converter 124 of the power converter 120 can include a plurality of bridge circuits coupled in parallel. The plurality of bridge circuits coupled in parallel can provided increased output power capability of the power converter 120. Each of the plurality of bridge circuits can include at least one switching element. The controller 115 can send control commands to control pulse width modulation of the switching elements of the plurality of bridge circuits so that the power converter 120 provides a suitable output power.

The controller 115 can include any number of control devices. In one implementation, the controller 115 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 120.

FIG. 2 depicts a circuit diagram of an exemplary inverter 122 of a power converter 120 according to an exemplary embodiment of the present disclosure. As shown, the inverter 122 can receive a DC input, for instance, from the DC link 125 or other DC input and can provide an AC output 160. The terms "input" and "output" are used herein for purposes of illustration and discussion. Those of ordinary skill in the art, using the disclosures provided herein, will understand that the input and output of the inverter 122 can vary depending on the power flow of the power system. Thus, the DC input can also serve as an output of the system and the AC output can also serve as an input of the system.

The inverter 122 can include a first bridge 132 and a second bridge 134. Each bridge 132 and 134 can include a bridge circuit for each phase (e.g. each of three phases) of the power converter 120. For instance, first bridge 132 includes a bridge circuit 136 for a phase of the first bridge 132. Second bridge 134 can include a bridge circuit 138 for a phase of the second bridge 134. The first bridge 132 and the second bridge 134 can be paralleled together such that the bridge circuit 136 is coupled in parallel with the bridge circuit 138. In this manner, the power converter 120 can include a set of a plurality of bridge circuits coupled in parallel for each phase of the power converter 120. Using parallel bridge circuits can increase the output power capability of the power converter 120.

Each bridge circuit includes a plurality of switching elements (e.g. IGBTs) coupled in series with one another. For instance, each bridge circuit includes an upper IGBT (e.g. IGBT 142) and a lower IGBT (e.g. IGBT 144). It will be appreciated by those of ordinary skill in the art that other suitable switching elements can be used in place of IGBTs, such as MOSFETs or other suitable switching elements. A diode is coupled in parallel with each of the IGBTs. Each bridge circuit can provide a bridge output at a node between the plurality of switching elements coupled in series. For instance, bridge circuit 136 provides bridge output 146. Bridge circuit 138 provides bridge output 148. The power converter 120 can include current sensors 150, such as current shunts or other suitable sensors, which are used to monitor the bridge current of the plurality of bridge circuits.

The bridge circuits of the power converter 120 are controlled, for instance, by providing control commands, using a suitable driver circuit, to the gates of the IGBTs. For example, a controller (e.g. controller 115 of FIG. 1) can provide suitable gate timing commands to the gates of the IGBTs of the bridge circuits. The control commands can control the pulse width modulation of the IGBTs to provide a desired output. The parallel bridge circuits, such as parallel bridge circuits 136 and 138, can be controlled according to any suitable switching pattern, such as according to an interleaved switching pattern or a non-interleaved switching pattern.

As illustrated, the bridge output of each bridge circuit includes an output inductor L1-L6. The output inductors L1-L6 can be used to filter high frequency components of the output power generated by the power converter 120. The output inductors L1-L6 can be built as three-phase components (e.g. wound on a single magnetic core with a separate magnetic path for each phase) such that L1-L3 are built on a single core and L4-L6 are built on a single core. The output inductors L1-L6 are effectively coupled between the parallel bridge circuits. For example, output inductors L3 and L6 are effectively coupled between the parallel bridge circuits 136 and 138.

Any timing differences between the switching of the switching elements of the parallel bridge circuits can cause a voltage across the output inductors L1-L6, leading to a circulating current between the parallel bridge circuits. This circulating current can result in a current imbalance between the parallel bridge circuits. In addition, because the output inductors can be built as three-phase components current imbalance in one phase of the power converter can affect current imbalance in the other phases of the power converter.

FIG. 3 depicts a control system 200 for reducing current imbalance among the parallel bridge circuits according to an exemplary embodiment of the present disclosure. The control system 200 can be implemented as part of or in conjunction with the controller 115 of FIG. 1. The various components of the control system 200 can be implemented using any suitable control devices. In one example, the components of the control system can be implemented by a processing device (e.g. a microprocessor, microcontroller, etc.) executing computer-readable instructions stored in a computer-readable medium.

In addition, FIG. 3 depicts control topology for providing control commands to two switching elements of the parallel bridge circuits, one for each parallel bridge circuit, for purposes of simplicity of illustration. Those of ordinary skill in the art, using the disclosures provided herein, will understand that similar control topology can be used to control all switching elements of the parallel bridge circuits according to exemplary aspects of the present disclosure. For instance, control commands can be provided to all twelve of the switching elements depicted in the power converter 120 of FIG. 2.

Referring to FIG. 3, the control system 200 can include a modulator 220 that receives a nominal control command $P_N$ from nominal control components 210 of the power system.

The nominal control command $P_N$ can specify a desired power, voltage and/or current output of the power converter 120 based on feedback and other settings in the power system. The nominal control command $P_N$ can be provided from nominal control components 210, such as voltage and current regulators, in the control system 200.

The modulator 220 processes the nominal control command $P_N$ and generates a nominal gate time control command $T_N$ to control the switching of switching elements in the parallel bridge circuits. The nominal gate time control command $T_N$ can specify a nominal switching time for the switching elements of the parallel bridge circuits.

According to exemplary aspects of the present disclosure, the nominal switching time specified by the nominal gate time control command $T_N$ can be adjusted to compensate for any timing differences in the switching times of the parallel bridge circuits. In particular, a pulse test can be performed in which a pulse is applied to the plurality of bridge circuits. For example, the controller 115 can perform the pulse test automatically and can measure the timing differences using voltage feedback circuits/sensors that instrument the bridge output voltages of the parallel bridge circuits. The responsiveness of the switching elements to the pulse can be analyzed, for instance by the controller 115, to identify any timing differences between the switching of the switching elements. Any identified timing differences can be used to determine a timing difference adjustment for the nominal gate time control command $T_N$. This timing difference adjustment can be stored in a memory and can be added to the nominal switching times specified by the nominal gate time control command $T_N$ to reduce or offset any timing differences between the switching of the switching elements.

In particular, the control system 200 can include a control circuit configured to adjust the nominal switch time of the nominal gate time control command $T_N$ based on the timing difference adjustment determined for the switching elements. For instance, a timing difference adjustment 222 determined for a switching element of the first bridge circuit 136 can be added at summing node 226 to the nominal gate time control command $T_N$ to generate the adjusted control command $T_{A1}$. The timing difference adjustment 224 determined for a switching element of the second bridge circuit 138 can be added at summing node 228 to the nominal gate time control command $T_N$ to generate the adjusted control command $T_{A2}$. The adjusted control command $T_{A1}$ can be provided to a driver circuit 230 where the control command $T_{A1}$ is conditioned into a suitable drive signal (e.g. a gate drive signal) for controlling a switching element of the first bridge circuit 136. Similarly, the adjusted control command $T_{A2}$ can be provided to a driver circuit 232 where the control command $T_{A2}$ is conditioned into a suitable drive signal (e.g. a gate drive signal) for controlling a switching element of the second bridge circuit 138.

The control system 200 can also include a closed loop control regime that reacts to any current imbalance between the parallel bridge circuits. For example, the control system 200 can be configured to further adjust the nominal gate time control command $T_N$ based on a monitored bridge current of the plurality of bridge circuits coupled in parallel. In particular, the control system 200 can monitor the bridge current of the first bridge circuit 136 and the second bridge circuit 138 coupled in parallel using current sensors 150. The current sensors 150 can be any suitable sensors, such as current shunts or other suitable sensors. The current sensors 150 can provide signals indicative of the bridge current to current balance regulator 240.

The current balance regulator 240 can include one or more control circuits used to generate adjustments to the nominal switch time specified by the nominal gate time control command $T_N$ based on the signals indicative of the bridge current received from the current sensors. For instance, the current balance regulator 240 can determine the difference between the bridge current of the first bridge circuit 136 and the second bridge circuit 138. The current balance regulator 240 can generate adjustments to the nominal gate time control command $T_N$ to reduce or minimize this difference in bridge current between the parallel bridge circuits. The adjustment to the nominal switch time specified by the nominal gate time control command $T_N$ can be added at summing nodes 226 and 228 to generate or contribute to the adjusted control commands $T_{A1}$ and $T_{A2}$. In this way, the control commands $T_{A1}$ and $T_{A2}$ can be adjusted to reduce current imbalance between the parallel bridge circuits.

FIG. 4 depicts a flow diagram of an exemplary control method (300) for reducing current imbalance between parallel bridge circuits in a power converter according to an exemplary embodiment of the present disclosure. The control method (300) can be implemented using any suitable system. In addition, FIG. 4 depicts steps performed in a particular order for purposes of illustration and discussion. Those of ordinary skill in the art, using the disclosures provided herein, should understand that various steps of the methods discussed herein can be omitted, rearranged, combined and/or adapted in various ways.

At (310) the method includes applying a pulse to each of the plurality of bridge circuits coupled in parallel of a power converter. In particular, a pulse can be applied to drive the switching elements of each of the plurality of bridge circuits coupled in parallel. The pulse can be any suitable signal that can trigger switching response of the switching elements of the bridge circuits coupled in parallel. The pulse can be performed at any suitable time. In one example, the pulse can be performed at startup of the power converter.

At (320), the switch timing of the switching elements of the parallel bridge circuits responsive to the pulse is monitored. For instance, the time it takes for each switching element to perform a switching operation can be monitored responsive to the pulse. The switch timing of the plurality of switching elements can then be analyzed to determine a timing difference adjustment for one or more of the switching elements (340). The determined timing difference adjustment(s) can be a timing offset that can be used to reduce or offset any timing differences between the switching of the switching elements responsive to the pulse. For example, the determined timing difference adjustment(s) can be a value that aligns the timing of the switching of the switching elements responsive to the pulse.

The determined timing difference adjustment(s) for the switching elements can be stored in a memory (350) so that the timing difference adjustments can be accessed to adjust subsequent switching of the switching elements of the parallel bridge circuits. At (360), the method includes controlling operation of the plurality of bridge circuits based on the determined timing difference adjustment(s) to reduce current imbalance between the parallel bridge circuits.

FIG. 5 depicts a flow diagram of an exemplary method (360) of controlling operation of the plurality of bridge circuits based on the determined timing difference adjustment(s) to reduce current imbalance between the parallel bridge circuits. Similar to FIG. 4, FIG. 5 depicts steps performed in a particular order for purposes of illustration and discussion. Those of ordinary skill in the art, using the disclosures provided herein, should understand that various steps of the methods discussed herein can be omitted, rearranged, combined and/or adapted in various ways.

At (362), a control command specifying a nominal switch time for a switching element of bridge circuit is received. For instance, a modulator can provide a control command for a switching element of one of a plurality of bridge circuits coupled in parallel. At (364), the nominal switch time specified by the control command is adjusted based on the determined timing difference adjustment. For instance, the determined timing difference adjustment can be added to the nominal switch time specified in the control command.

At (366) the bridge current of the plurality of bridge circuits can be monitored using suitable current sensors. The nominal switch time specified by the control command can be further adjusted based on the bridge current of the plurality of bridge circuits (368). For instance, the nominal switch time can be adjusted to reduce or minimize a difference between the bridge current of the plurality of bridge circuits coupled in parallel. At (370), the method can include controlling the bridge circuit based on the adjusted nominal switch time. For instance, the switching element of the bridge circuit can perform a switching operation at the adjusted nominal switch time specified by the control command.

An exemplary application of the control scheme of the present disclosure will now be discussed with reference to an exemplary DFIG wind turbine system. FIG. 6 depicts an exemplary DFIG wind turbine system 400 according to an exemplary embodiment of the present disclosure. In the exemplary system 400, a rotor 406 includes a plurality of rotor blades 408 coupled to a rotating hub 410, and together define a propeller. The propeller is coupled to an optional gear box 418, which is, in turn, coupled to a generator 420. In accordance with aspects of the present disclosure, the generator 420 is a doubly fed induction generator (DFIG) 420.

DFIG 420 can be coupled to a stator bus 454. The stator bus 454 provides an output multiphase power (e.g. three-phase power) from a stator of DFIG 420. The rotor of the DFIG 420 can be coupled to the power converter 120 via rotor bus 456. The power converter 120 can have a similar configuration to the power converter 120 depicted in FIGS. 1 and 2. DFIG 420 is coupled via rotor bus 456 to an inverter 122. The inverter 122 is coupled to a converter 124 which in turn is coupled to a line side bus 488.

In exemplary configurations, the inverter 122 and the converter 124 are configured for normal operating mode in a three-phase, pulse width modulation (PWM) arrangement using insulated gate bipolar transistor (IGBT) switching elements as discussed in detail above. The inverter 122 and the converter 124 can be coupled via a DC link 125 across which is the DC link capacitor 126.

The power converter 120 can be coupled to a controller 115 to control the operation of the inverter 122 and the converter 124. It should be noted that the controller 115, in typical embodiments, is configured as an interface between the power converter 120 and a control system 476. The controller 115 can include any number of control devices and can be used to implement the control scheme(s) disclosed herein.

In typical configurations, various line contactors and circuit breakers including, for example, grid breaker 482 can be included for isolating the various components as necessary for normal operation of DFIG 420 during connection to and disconnection from the electrical grid 484. A system circuit breaker 478 can couple the system bus 460 to a transformer 480, which is coupled to the electrical grid 484 via grid breaker 482.

In operation, alternating current power generated at DFIG 420 by rotating the rotor 406 is provided via a dual path to electrical grid 484. The dual paths are on the stator side by the stator bus 454 and on the rotor side by the rotor bus 456. On the rotor side, sinusoidal multi-phase (e.g. three-phase) alternating current (AC) power is provided to the power converter 120. The inverter 122 converts the AC power provided from DFIG 420 into direct current (DC) power and provides the DC power to the DC link 125. Switching elements (e.g. IGBTs) used in parallel bridge circuits of the inverter 122 can be modulated to convert the AC power provided from DFIG 420 into DC power suitable for the DC link 125.

The converter 124 converts the DC power on the DC link 125 into AC output power suitable for the electrical grid 484. In particular, switching elements (e.g. IGBTs) used in bridge circuits of the power converter 124 can be modulated to convert the DC power on the DC link 125 into AC power on the line side bus 488. The AC power from the power converter 120 can be combined with the power from the stator of DFIG 420 to provide multi-phase power (e.g. three-phase power) having a frequency maintained substantially at the frequency of the electrical grid 484 (e.g. 50 Hz/60 Hz).

Various circuit breakers and switches, such as grid breaker 482, system breaker 478, stator sync switch 458, converter breaker 486, and line contactor 472 can be included in the system 400 to connect or disconnect corresponding buses, for example, when current flow is excessive and can damage components of the wind turbine system 400 or for other operational considerations. Additional protection components can also be included in the wind turbine system 400.

The power converter 120 can receive control signals from, for instance, the control system 476 via the controller 115. The control signals can be based, among other things, on sensed conditions or operating characteristics of the wind turbine system 400. Typically, the control signals provide for control of the operation of the power converter 120. For example, feedback in the form of sensed speed of the DFIG 420 can be used to control the conversion of the output power from the rotor of the DFIG 420 to maintain a proper and balanced multi-phase (e.g. three-phase) power supply. Other feedback from other sensors can also be used by the controller 474 to control the power converter 120, including, for example, stator and rotor bus voltages and current feedbacks. Using the various forms of feedback information, switching control signals (e.g. gate timing commands for IGBTs), stator synchronizing control signals, and circuit breaker signals can be generated. These switching times specified by these switching control signals can be adjusted according to aspects of the present disclosure to reduce current imbalance among parallel bridge circuits used in the inverter 122 and/or the converter 124.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method for reducing current imbalance between a plurality of bridge circuits in a multi-phase power converter, the plurality of bridge circuits being coupled in parallel for a same phase of the multi-phase power converter, the control method comprising:

applying a pulse as part of a pulse test to each of the plurality of bridge circuits coupled in parallel for the same phase of the power converter, each of the plurality of bridge circuits comprising at least one switching element;

determining a timing difference between the parallel bridge circuits responsive to the pulse applied during the pulse test, the timing difference determined based on a time it takes for each switching element to perform a switching operation responsive to the pulse;

analyzing the timing difference between the parallel bridge circuits to determine a timing difference adjustment for one or more of the switching elements of the plurality of bridge circuits, the timing difference adjustment comprising a timing offset to reduce the timing difference between the parallel bridge circuits;

generating one or more control commands based at least in part on the timing difference adjustment; and controlling operation of the plurality of bridge circuits based at least in part on the one or more control commands.

2. The control method of claim 1, wherein each of the plurality of bridge circuits comprises a plurality of switching elements coupled in series with one another.

3. The control method of claim 1, wherein the at least one switching element comprises an insulated gate bipolar transistor (IGBT).

4. The control method of claim 1, wherein at least one inductive element is coupled between the plurality of bridge circuits coupled in parallel.

5. The control method of claim 1, wherein generating one or more control commands based at least in part on the timing difference adjustment comprises:

receiving one or more control commands, each control command specifying a nominal switch time for one of the switching elements of the plurality of bridge circuits coupled in parallel; and adjusting the nominal switch time of the one or more control commands based at least in part on the timing difference adjustment.

6. The control method of claim 5, wherein adjusting the nominal switch time of the one or more control commands based at least in part on the timing difference adjustment comprises adding the timing difference adjustment to the nominal switch time.

7. The control method of claim 1, wherein the power converter comprises a DC to AC conversion stage.

8. The control method of claim 1, wherein the power converter is part of a power generation system.

9. A control system for reducing current imbalance in a multi-phase power converter, the multi-phase power converter comprising a plurality of bridge circuits coupled in parallel for a same phase of the multi-phase power converter, each of the plurality of bridge circuits comprising at least one switching element, the control system comprising:

a modulator configured to provide one or more control commands to the plurality of bridge circuits coupled in parallel for the same phase of the power converter, each of the one or more control commands controlling a nominal switch time for one of the switching elements of the plurality of bridge circuits coupled in parallel;

a control circuit configured to adjust the nominal switch time for the one or more control commands based at least in part on a timing difference adjustment determined for at least one of the switching elements of the plurality of bridge circuits coupled in parallel for the same phase of the power converter;

wherein the timing difference adjustment is determined based on a timing difference measured responsive to a pulse applied to the plurality of bridge circuits coupled in parallel for the same phase of the power converter as part of a pulse test;

wherein the timing difference is determined based on a time it takes for each switching element to perform a switching operation responsive to the pulse;

wherein the timing difference adjustment comprises a timing offset to reduce the timing difference between the parallel bridge circuits.

10. The control system of claim 9, wherein the modulator is configured to provide the one or more control commands to control pulse width modulation of the switching elements of the bridge circuits to achieve an output power for the power converter.

11. The control system of claim 9, wherein the control system further comprises a plurality of current sensors, each of the plurality of current sensors capable of providing a signal indicative of the bridge current of one of the plurality of bridge circuits coupled in parallel.

12. A power converter system, comprising:

a plurality of bridge circuits coupled in parallel for a same phase of a multiphase power converter, each of the plurality of bridge circuits comprising a pair of switching elements coupled in series with one another;

a control system configured to reduce current imbalance between the plurality of bridge circuits coupled in parallel for the same phase of the power converter, the control system comprising:

a modulator configured to provide one or more control commands to the plurality of bridge circuits coupled in parallel for the same phase of the power converter, each of the one or more control commands specifying a nominal switch time for one of the switching elements of the plurality of bridge circuits coupled in parallel for the same phase of the power converter;

a control circuit configured to adjust the nominal switch time of the one or more control commands based at least in part on a timing difference adjustment determined for at least one of the switching elements of the plurality of bridge circuits coupled in parallel for the same phase of the power converter;

wherein the timing difference adjustment is determined based on a timing difference measured responsive to a pulse applied to the plurality of bridge circuits coupled in parallel for the same phase of the power converter as part of a pulse test;

wherein the timing difference is determined based on a time it takes for each switching element to perform a switching operation responsive to the pulse;

wherein the timing difference adjustment comprises a timing offset to reduce the timing difference between the parallel bridge circuits.

13. The power converter system of claim 12, wherein the control system further comprises a plurality of current sensors, each of the plurality of current sensors capable of providing a signal indicative of the bridge current of one of the plurality of bridge circuits coupled in parallel.

14. The power converter system of claim 12, wherein the power converter comprises a DC to AC conversion stage.

15. The power converter system of claim 12, wherein the power converter is part of a power generation system.

* * * * *